United States Patent [19]

Dennis

[11] Patent Number: 5,465,988

[45] Date of Patent: Nov. 14, 1995

[54] UTILITY CART

[76] Inventor: Macy S. Dennis, 221 N. Demanade, Lafayette, La. 78503

[21] Appl. No.: 318,547

[22] Filed: Oct. 5, 1994

Related U.S. Application Data

[63] Continuation of Ser. No. 949,074, Sep. 21, 1992, Pat. No. 5,380,022.

[51] Int. Cl.$^6$ ........................................................ B62B 3/12
[52] U.S. Cl. ........................................ 280/47.35; 220/23.83; 280/47.371; 296/22
[58] Field of Search ................................... 220/408, 410, 220/23.83; 296/22; 280/47.35, 47.34, 47.36, 87.01, 47.371, 651, 655

[56] References Cited

U.S. PATENT DOCUMENTS

| D. 183,950 | 11/1958 | Skaller | 280/47.35 X |
|---|---|---|---|
| 1,176,106 | 3/1916 | True | 296/22 |
| 1,455,395 | 5/1923 | Exum | 296/22 X |
| 1,760,854 | 5/1930 | Wright | 280/47.35 X |
| 2,603,500 | 2/1952 | Messier | 296/22 X |
| 2,771,318 | 11/1956 | Jagsch | 296/22 |
| 3,874,531 | 4/1975 | Mayo | 280/47.35 X |
| 3,889,967 | 6/1975 | Sauer | 280/47.35 |
| 3,940,175 | 2/1976 | Robison | 296/22 |
| 5,306,029 | 4/1994 | Kaiser | 296/22 X |

FOREIGN PATENT DOCUMENTS

| 435595 | 3/1948 | Italy | 296/22 |
|---|---|---|---|

Primary Examiner—Margaret A. Focarino
Assistant Examiner—Michael Mar
Attorney, Agent, or Firm—John M. Harrison

[57] ABSTRACT

A utility cart which includes in a first preferred embodiment, a cart frame fitted with a pair of fixed rear wheels and a single, steerable front wheel and further including a divided ice chest with a hinged lid and a storage compartment lying adjacent to the ice chest. Removable chair supports are upward-standing from the storage compartment for stacking one or more folded lawn chairs or the like and to provide a location for hanging a trash bag. Four tables are hinged to the cart frame in drop-leaf fashion for selected horizontal extension and support. A pair of vertical umbrella brackets receive an umbrella support to shade the table tops.

In another preferred embodiment of the invention the cart frame includes a receptacle for receiving an ice chest specifically designed for the purpose or a conventional ice chest, and in both embodiments of the invention a telescoping handle facilitates towing of the utility cart and positioning the utility cart in a desired location. In a most preferred embodiment of the invention the utility carts components, including the table top lids and chair storage supports, are constructed of expanded foam insulation sandwiched between plastic sheets.

1 Claim, 3 Drawing Sheets

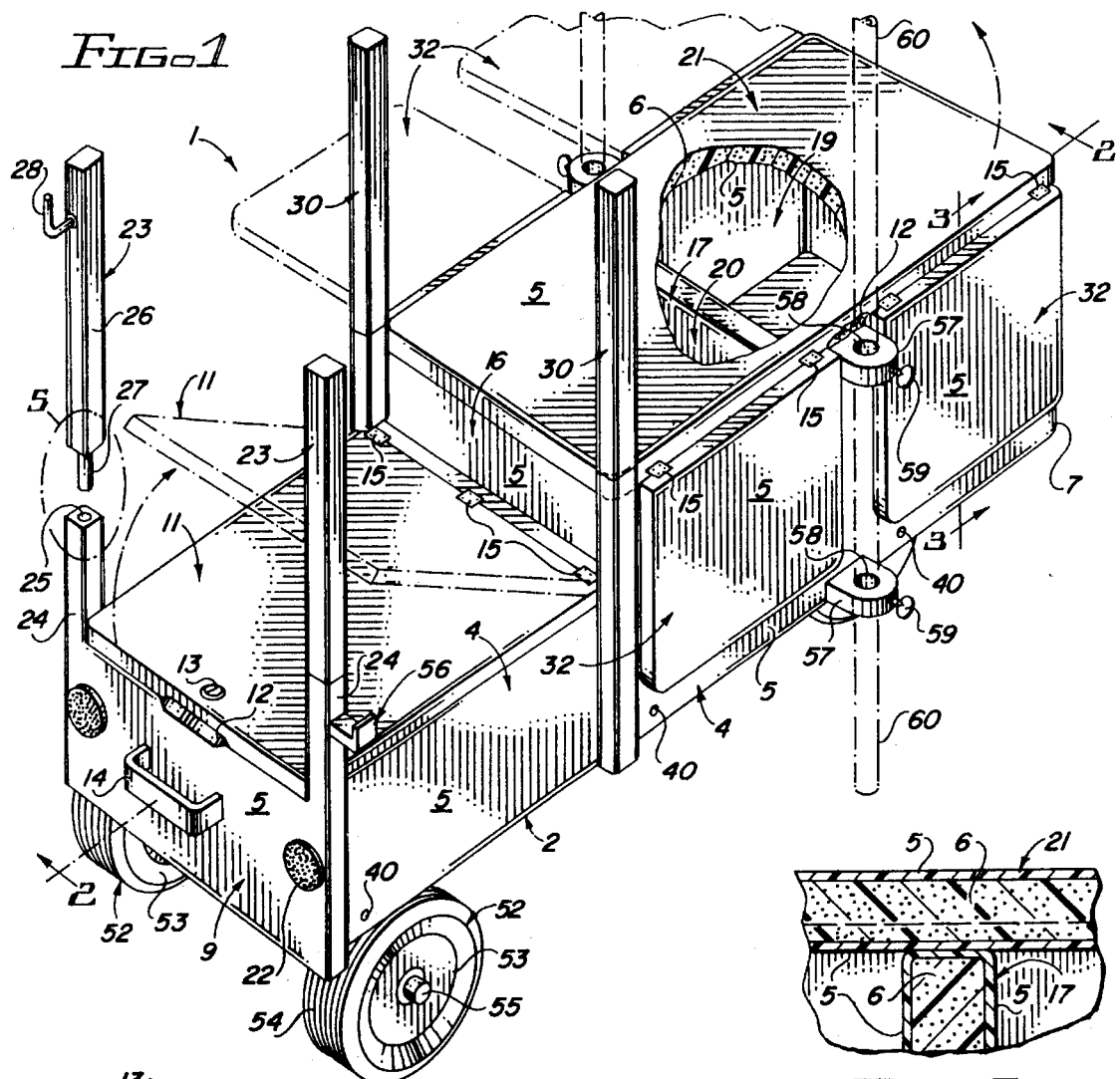
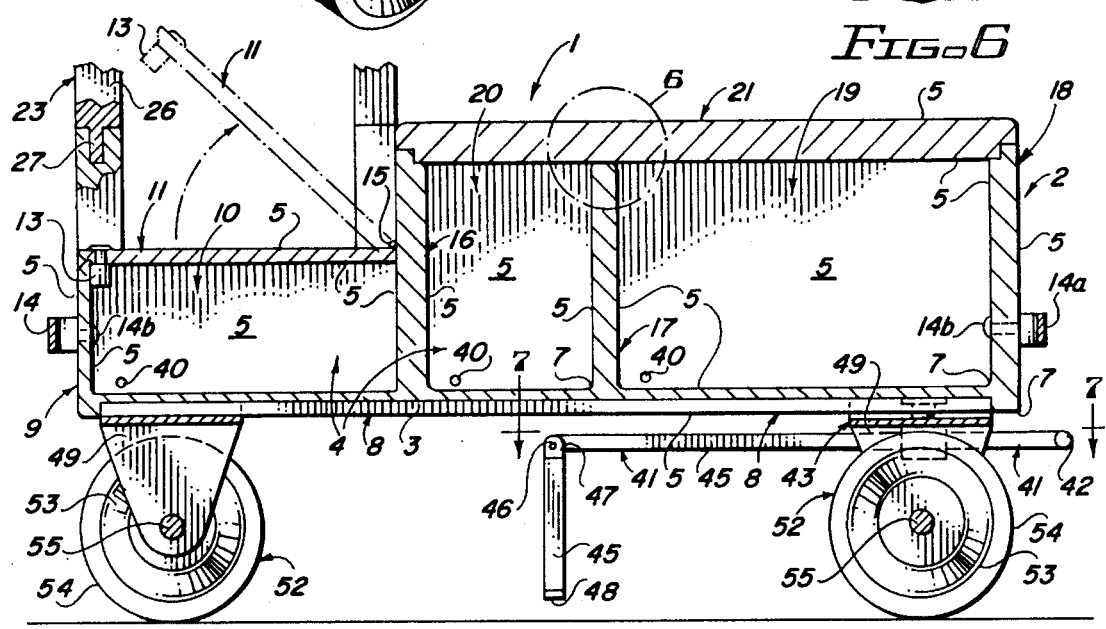

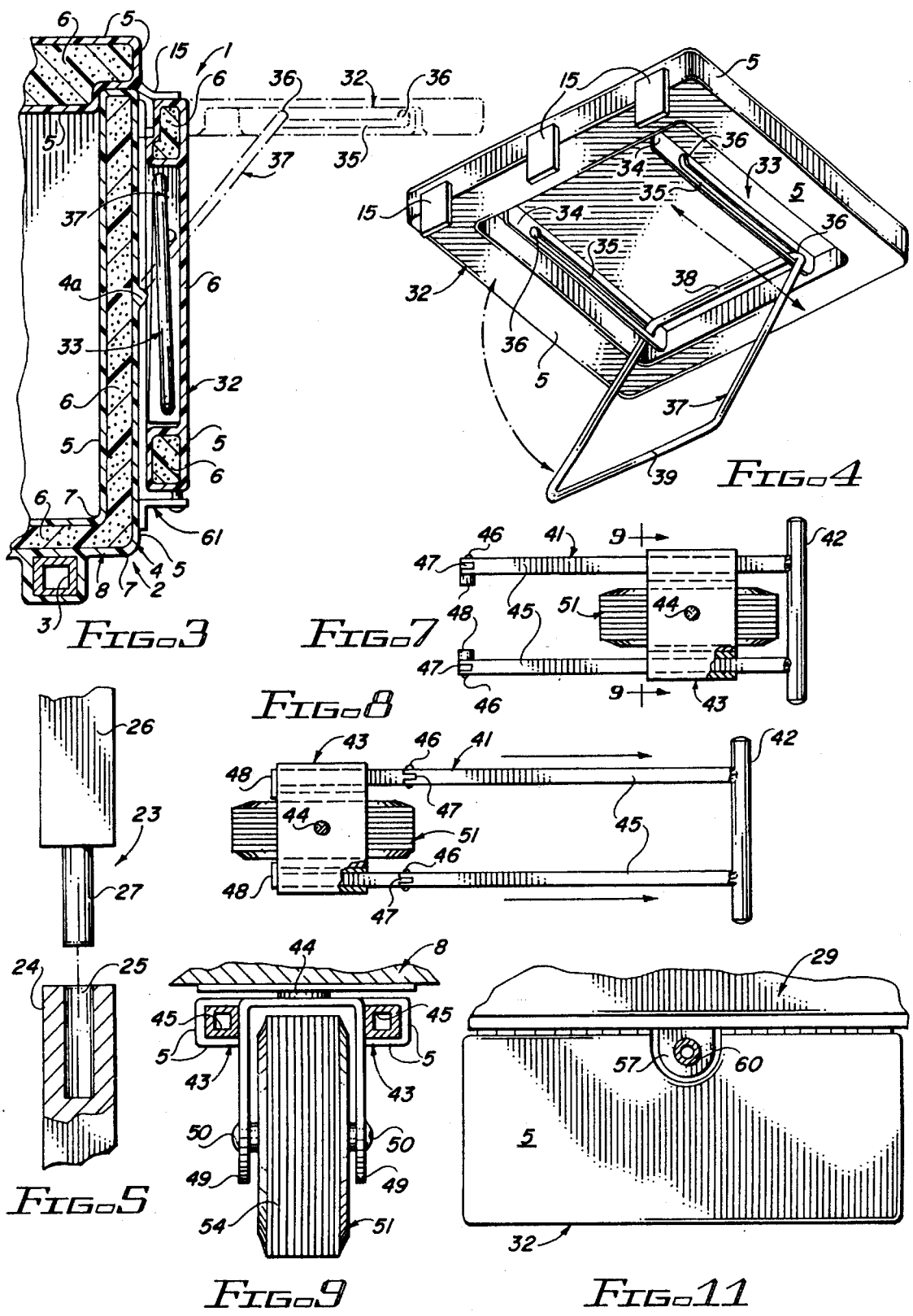

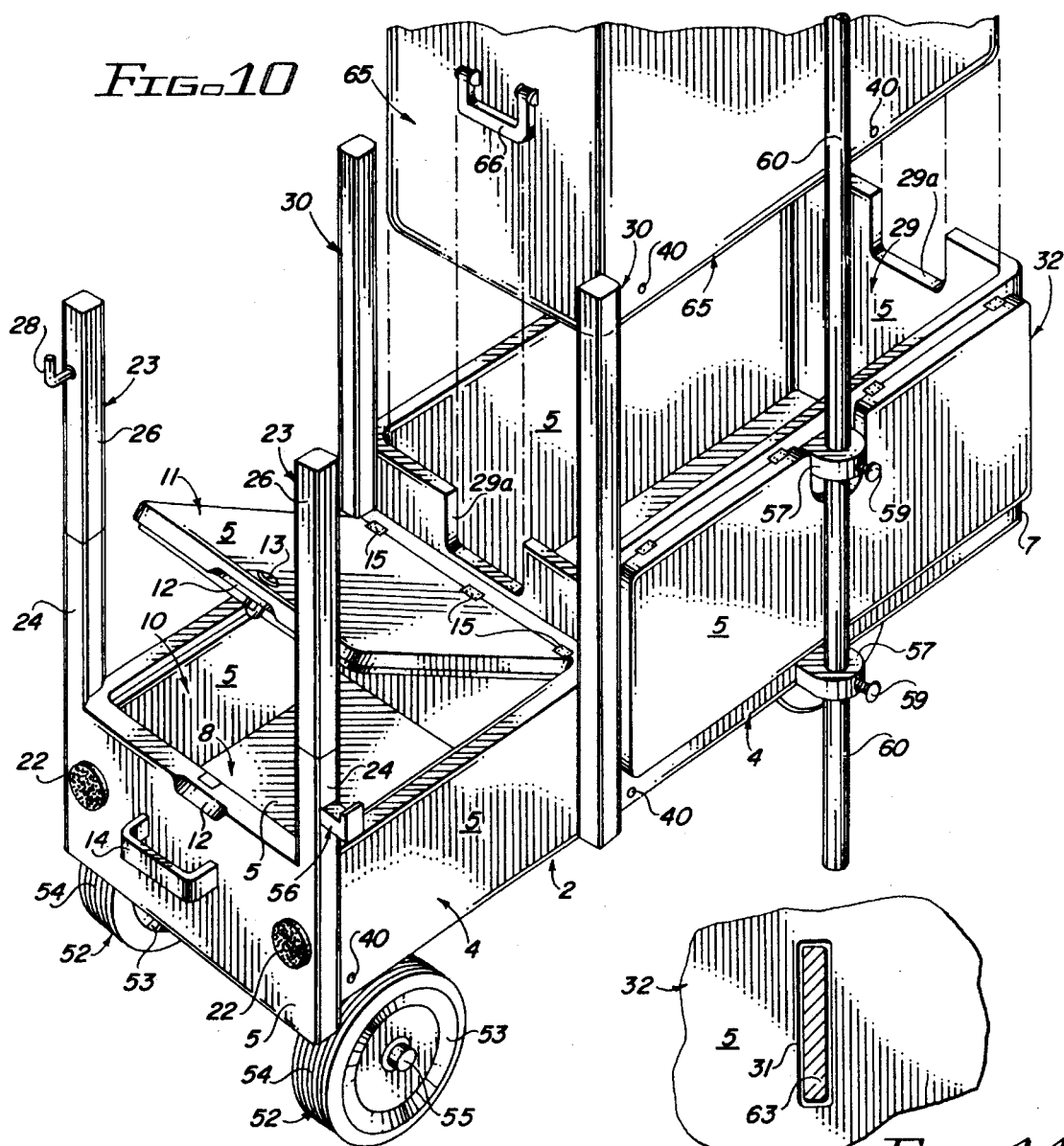
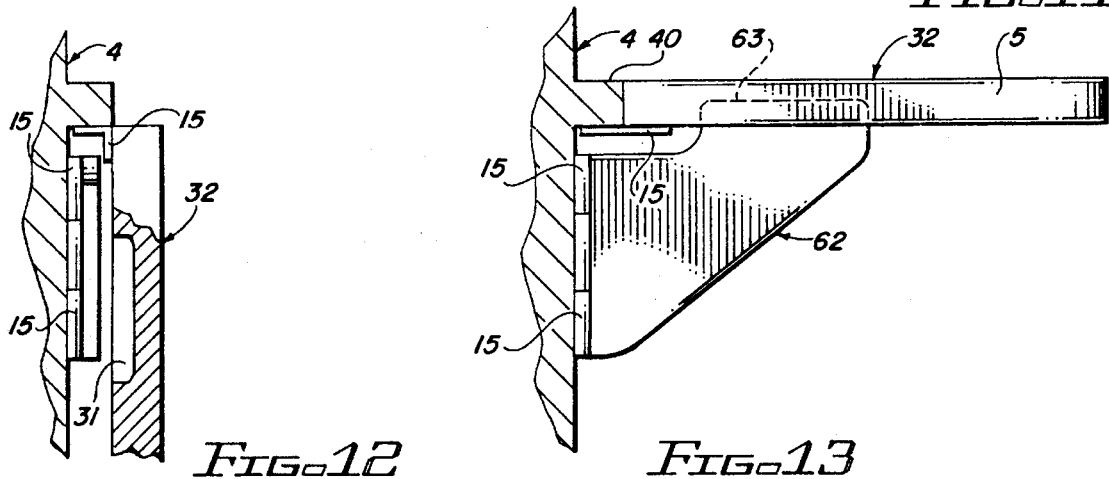

UTILITY CART

This is a continuation of application Ser. No. 07/949,074 filed on Sep. 21, 1992, now U.S. Pat. No. 5,380,022.

BACKGROUND OF THE INVENTION

1. Field of the Invention

This invention relates to utility containers, caddys and carts and more particularly, to a utility cart which is characterized in a first preferred embodiment by a cart frame fitted with a pair of spaced, fixed rear wheels and a single, steerable front wheel having a recessing handle for steering purposes. The cart frame further includes a divided ice chest accessible by a single hinged ice chest lid, a storage compartment lying adjacent to the ice chest and accessible by a storage compartment lid, removable chair supports upward-standing in spaced relationship from the cart frame above the storage compartment for supporting a trash bag and receiving one or more folding lawn chairs, four table tops hinged to the cart frame on each side of the ice chest for pivoting into horizontal position as tables and a pair of vertically-aligned umbrella brackets fitted with thumb screws for receiving an umbrella support and deploying an umbrella above the table tops.

In a second preferred embodiment of the invention the cart frame of the utility cart includes an ice chest receptacle fitted with receptacle slots for accommodating an ice chest specifically designed for the purpose, as well as a conventional ice chest. Furthermore, this embodiment of the utility cart also includes a single table top hinged to each side of the ice chest receptacle for pivotal horizontal extension to define a table which is shaded by one or more umbrellas mounted on umbrella stand(s) fitted in umbrella brackets extending from the cart frame.

One of the problems which is realized in outings such as picnics, festivals, outdoor family reunions, beach activities, "tailgate" parties at football games and other athletic contests and outdoor gatherings is the facility for conveniently, effectively, and comfortably serving various numbers of people. Outside activities of this nature are typically held under a canopy, tree or in the shade of a structure such as a building to block the direct sunlight and beverages are normally cooled in ice chests and coolers of various description which are hand-carried to the location and spread around the area. Trash and litter are normally deposited on the ground, or at best in one or more trashbags lying adjacent to the ice chests and the guests usually bring their own folding chairs or stools for seating purposes, with no protection from the sun and rain. The primary problem in most of these outings is the facility for transporting and organizing the various ice chests, lawn chairs, umbrellas, trash containers, miscellaneous food items and other utility items to effectively and comfortably seat, feed, shade and protect the guests.

2. Description of the Prior Art

Various types of caddys, carts and other vehicles are known in the art. U.S. Pat. No. 3,677,571, dated Jul. 18, 1972, to T. F. Maturo, Jr., et al, details a "Beach Cart" which includes a collapsible tubular frame that attaches a carrying bag for storing articles. A roller is connected to the frame to allow transport of the cart through sand and the roller is constructed of annular end plates with a cylindrical mesh screen attached to the end plates. The frame includes extending arms for conveniently supporting a beach chair. U.S. Pat. No. 4,550,931, dated Nov. 5, 1985, to T. Ziaylek, Jr., details a "Wheeled Container, Especially For Use By Fire-Fighting and Rescue Squads". The wheeled container includes a rectangular base receptacle provided with recessed wheels at one end and a handle that telescopes to a non-use position in order to impart to the receptacle a generally rectangular outer configuration, adapting it to fit into the small storage compartments in fire-fighting or rescue vehicles. The container is modular, which allows the addition of one or more receptacles in a stacked arrangement on the base receptacle and a cover is removably seated on either the base receptacle or, if several receptacles are stacked, upon the uppermost receptacle. A "Portable, Wheeled Cooler Apparatus" is detailed in U.S. Pat. No. 4,724,681, dated Feb. 16, 1988, to Allan E. Bartholomew, et al. The apparatus includes a cooler chest assembly, a support wheel assembly upon which the cooler chest assembly is mounted and a combination handle and lock assembly connected to the cooler chest assembly to act as a lock in an enclosed condition and as a handle in a transport condition, U.S. Pat. No. 4,863,075, dated Sep. 5, 1989, to Robert Romer, details a "Beach Caddy". The beach caddy is used for transporting and storing items for recreational use at the beach and is provided with runners for drawing across sandy surfaces and detachable wheels for rolling over paved surfaces. A refillable water tank within the caddy dispenses fluids for washing, drinking or any other desired use and an adjustable support is provided for retaining a beach umbrella and permitting the umbrella to be tilted in any desired direction. Detachable tables mounted on the sides of the caddy can be set up to support items transported by the caddy. A "Collapsible Cart Assembly" is detailed in U.S. Pat. No. 4,865,346, dated Sep. 12, 1989, to Ed Carlile. The cart assembly is hand-propelled for use in support of activities such as picnics or beach activity and includes a separable wheeled frame having an upright section which includes upper and lower portions. A foldable shelf member on the lower portion supports a cooler chest and is provided with stabilizing elements which include lateral shifting of the chest during movement of the cart. A pair of arms on the lower portion accommodate one or more seating members such as folding chairs, while receiver elements retain an umbrella and drink receptacles. The upper portion of the upright section supports a container having a fold-down serving shelf adjacent to an accessory panel presenting a radio, thermometer and other accessories. U.S. Pat. No. 4,976,448, dated Dec. 11, 1990, to Wayne M. Wickersham, et al, details a "Mobile Cooler Chest and Cooler Chest Support". The mobile cooler chest is constructed with a pair of ground-engaging wheels supporting one end of the chest. A U-shaped towing handle is pivotally mounted on the opposite end of the chest for movement between a projecting towing position and a downwardly-projecting standing position, in which the handle supports the chest in cooperation with the wheels in a stationary level position. A second embodiment of the mobile cooler chest includes a lid on the cooler chest with a first chest having a lid and a bottom wall. A second chest has a bottom wall, with a mating perimeter bead and a projection formed on the second chest bottom wall and first chest lid for nesting the second chest to the first chest. A third embodiment includes a cooler chest support having a support member with a first end and a second end. An axle is mounted on the first end, with a wheel rotatably mounted on the axle and a pull handle is connected to the second end for pulling the cooler chest support.

There is a need for a light-weight, compact utility cart fitted with an ice chest or ice chest receptacle, a locking storage compartment for miscellaneous accessories, removable chair supports for supporting folded lawn chairs and a trash bag or bags, folding table tops adapted for extension to accommodate several people during meals and an umbrella for shading the occupants of the table tops and protecting them from rain. It is therefore an object of this invention to provide a utility cart having these features.

Another object of this invention is to provide a new and improved utility cart which is characterized by a compact, light-weight cart frame fitted with a pair of fixed rear wheels and a steerable front wheel and having either one or more built-in ice chests or an ice chest receptacle for receiving an ice chest specifically designed for the purpose or a conventional ice chest, as well as a storage compartment, upward-standing, removable chair supports for supporting one or more trash bags and accommodating folding lawn chairs or the like, folding table tops for receiving guests during meals and umbrella brackets for removably and adjustably receiving one or more umbrellas and protecting the occupants of the tables.

Yet another object of this invention is to provide a wheeled utility cart, one of which wheels is steerable by a collapsing handle and a cart frame constructed of an expanded foam insulation sandwiched between panel plates or sheets to provide strength with reduced weight arid superior insulating qualities.

Still another object of this invention is to provide a utility cart for use at parties, festivals, picnics, beach activities, athletic "tailgate" gatherings and like occasions, which utility cart includes a wheeled cart frame, the front wheel of which is steerable by means of a collapsing handle and the rear wheels of which are fixed. The cart frame further includes lifting handles, an insulated, divided ice chest fitted with an insulated hinged lid or an insulated ice chest container or receptacle also having a hinged lid, as well as two or more hinged table tops arranged for deployment upwardly in horizontal, functional configuration to serve breakfast, lunch or dinner guests and downwardly in non-functional, folded configuration, one or more umbrellas for shading the guests, providing protection from the rain and providing a storage or utility compartment.

SUMMARY OF THE INVENTION

These and other objects of the invention are provided in a new and improved utility cart fitted with three wheels, two of which are fixed and the front one of which is steerable with a collapsible steering handle and further including an insulated divided ice chest or ice chest receptacle having a hinged top and a locking storage compartment positioned adjacent to the ice chest or ice chest receptacle and also fitted with a hinged top for storing accessory items. In a most preferred embodiment, four removable chair supports project upwardly from the cart frame above the storage compartment for receiving one or more folding lawn chairs or like supports, a trash bag hook is mounted on at least one of the chair supports, two or more table tops are hinged to opposite sides of the cart frame for deployment in upward, horizontal functional configuration and folded in non-functional configuration. A pair of vertical umbrella brackets receive an umbrella support to deploy an umbrella over the utility cart, provide protection from the rain and shade the occupants of the tables when the tables are positioned in either the horizontal or vertical orientation.

BRIEF DESCRIPTION OF THE DRAWINGS

The invention will be better understood by reference to the accompanying drawings, wherein:

FIG. 1 is a perspective view of a first preferred embodiment of the utility cart of this invention;

FIG. 2 is a sectional view taken along line 2—2 of the utility cart illustrated in FIG. 1;

FIG. 3 is a sectional view taken along line 3—3 of the utility cart illustrated in FIG. 1;

FIG. 4 is a bottom perspective view of a typical folding mechanism for one set of table tops hinged to the cart frame of the utility cart illustrated in FIG. 1;

FIG. 5 is an exploded view, partially in section, of a preferred rear chair support for supporting lawn chairs or the like in the utility cart illustrated in FIG. 1;

FIG. 6 is an enlarged sectional view of the intersection between the partition panel and ice chest lid of the utility cart illustrated in FIGS. 1 and 2;

FIG. 7 is a sectional view taken along line 7—7 of the front wheel assembly of the utility cart illustrated in FIG. 2, more particularly illustrating the towing handle in recessed configuration;

FIG. 8 is a top view of the towing handle illustrated in FIG. 7, with the towing handle in extended towing configuration;

FIG. 9 is a sectional view taken along line 9—9 of the front wheel assembly, including the towing handle and front portion of the utility cart illustrated in FIG. 7;

FIG. 10 is a perspective view of a second preferred embodiment of the utility cart of this invention;

FIG. 11 is a top view of a table top in horizontally extended, functional configuration as attached to the utility cart illustrated in FIG. 10;

FIG. 12 is a sectional view of an alternative table support positioned in folded configuration with respect to the cart frame of the utility cart illustrated in FIG. 10;

FIG. 13 is a sectional view of the table top illustrated in FIG. 12 in horizontally deployed, functional configuration; and FIG. 14 is a bottom view, partially in section, of the table top, illustrating a recess in the table top.

DESCRIPTION OF THE PREFERRED EMBODIMENTS

Referring initially to FIGS. 1–4 of the drawings, in a first preferred embodiment the utility cart of this invention is generally illustrated by reference numeral 1. The utility cart 1 is characterized by a cart frame 2, fitted with metal longitudinal frame supports 3, encapsulated in a panel plate 5, as illustrated in FIGS. 1–3. The side panels 4, bottom panel 8, storage end panel 9 and front panel 18, as well as other components of the cart frame 2, include an expanded foam insulation such as "Styrofoam" or expanded polyurethane insulation 6, which is encapsulated by molded plastic panel plates 5 to create superior strength and insulating characteristics for the utility cart 1. The cart frame 2 is shaped and molded by techniques known to those skilled in the art to define plate bends 7 at the points of juncture of the side panels 4, bottom panel 8, storage end panel 9 and front panel 18, respectively, which eliminates sharp edges, produces an esthetically pleasing appearance and maintains good insulation qualities. In this embodiment of the invention the side panels 4, front panel 18 and separator panel 16 define a front ice chest 19 and rear ice chest 20, separated by a partition panel 17. Both the front ice chest 19 and the rear ice chest 20 utilize a common ice chest lid 21, the separator panel 16, partition panel 17 and ice chest lid 17 being preferably constructed of the same expanded foam insulation 6 and panel plates 5 as the remaining elements of the cart frame 2 described above. In a most preferred embodiment of the invention the ice chest lid 21 is attached to one of the side panels 4 by means of vinyl hinges 15 in the same manner as the popular "Igloo" ice chest which is well known to those skilled in the art.

A locking storage compartment 10 is constructed adjacent to and rearwardly of the rear ice chest 20 and includes a storage compartment lid 11, also fitted with vinyl hinges 15 for hingedly connecting the storage compartment lid 11 to the cart frame 2. A pair or corresponding finger notches 12 are provided in the storage end panel 9 and the storage compartment lid 11 to facilitate easy lifting of the storage compartment lid 11 with respect to the storage compartment 10, as illustrated in phantom in FIG. 1. A lock 13 may also be provided in the storage compartment lid 11 for engaging the storage end panel 9 in conventional fashion when the storage compartment lid 11 is closed on the storage compartment 10. A rear handle 14 is also attached to the storage end panel 9 and a front handle 14a is similarly secured to the opposite end of the utility cart 1 at the front panel 18, both by means of handle bolts 14b, as further illustrated in FIG. 2. Reflectors 22 may also be provided on the storage end panel 9 to facilitate better viewing of the utility cart 1 at night.

Referring now to FIGS. 1, 2 and 5 of the drawings, in a most preferred embodiment of the invention a pair of removable rear chair supports 23 project upwardly from the cart frame 2 at the storage end panel 9 in spaced, parallel relationship. In a most preferred embodiment, each of the rear chair supports 23 is characterized by a support pedestal 24, fixed to the cart frame 2 at the storage end panel 9 and a corresponding top member 26, fitted with a peg 27 which is inserted in a corresponding peg opening 25 provided in the support pedestals 24, respectively, as illustrated in FIGS. 1 and 5. Furthermore, a pair of front chair supports 30 project upwardly from the cart frame 2 in spaced relationship with respect to each other and to the parallel rear chair supports 23 to define a storage space above the storage compartment 10 and between the respective sets of rear chair supports 23 and front chair supports 30, for stacking folding lawn chairs or the like (not illustrated). In another preferred embodiment of the invention a trash bag hook 28 is attached to one or more of the rear chair supports 23 for suspending a trash bag (not illustrated) in convenient functional configuration on the utility cart 1.

Referring again to FIGS. 1, 3 and 4 of the drawings, in a most preferred embodiment of the invention four table tops 32 are independently connected to the side panels 4 of the cart frame 2 by means of additional vinyl hinges 15. Each of the table tops 32 is further characterized by a cavity 33, as illustrated in FIGS. 3 and 4. A pair of parallel bracket plates 34 are secured in the cavity 33, each featuring a plate slot 35, with a pair of oppositely-disposed slot offsets 36 provided at each end of the plate slot 35, as further illustrated in FIG. 4. The slot-engaging leg 38 of a support bar 37 engages each of the plate slots 35 in sliding relationship and is adapted to selectively seat in either of the opposite slot offsets 36, as hereinafter further described. In a preferred embodiment the support bar 37 is square or rectangular in configuration and includes a shelf-engaging leg 39 located opposite the slot-engaging leg 38 for engaging a respective leg shelf 4a, formed in each side panel 4 of the cart frame 2, as illustrated in FIG. 3. Accordingly, referring again to FIGS. 3 and 4 of the drawings, when it is desired to deploy the respective table tops 32 from the non-functional, folded configuration after releasing the table top retainer 61, illustrated in FIG. 3, to the outwardly-extended, horizontal, functional configuration illustrated in FIGS. 3 and 4, the table top 32 is extended upwardly on the respective vinyl hinges 15 as the support bar 37 is manipulated to relocate the slot-engaging leg 38 from the parallel slot offsets 36, which are located closest to the vinyl hinges 15, to the opposing parallel slot offsets 36. The shelf-engaging leg 39 is then positioned to engage the leg shelf 4a and support the respective table tops 32 in a substantially horizontal configuration, as illustrated in phantom in FIGS. 1 and 3.

Referring now to FIGS. 2 and 7–9, in another preferred embodiment of the invention the utility cart 1 is characterized by a towing handle 41 featuring parallel handle extensions 45, mounted in sliding relationship in a common front wheel bracket 43 and connected at the towing end by a handle grip 42, as particularly illustrated in FIGS. 7 and 8. A wheel pivot 44 is provided in the front wheel bracket 43 and mounts to the bottom panel 8 of the cart frame 2, to facilitate pivoting of a front wheel 51 while the utility cart 1 is towed, as hereinafter further described. Each of the handle extensions 45 is further fitted with an extension hinge 47 and a hinge pin 46 to allow folding of the rear portion of the handle extension 45 downwardly at the extension hinges 47, respectively, as illustrated in FIGS. 2 and 7 when the towing handle 41 is retracted with respect to the cart frame 2. Under circumstances where it is desired to tow the utility cart 1, the handle grip 42 is grasped by one or more people and the handle extensions 45 are extended forwardly in the direction of the arrow illustrated in FIG. 8 to straighten the extension hinges 47 and extend the handle extensions 45 to their full length through the front wheel bracket 43 until further extension is terminated by means of the extension stops 48, attached to the hinged ends of the handle extensions 45. The utility cart 1 can then be towed and guided by one or more people as the handle grip 42 and front wheel 51 are manipulated in an arc to control the direction of movement of the utility cart 1.

As further illustrated in FIGS. 2 and 9, a U-shaped wheel support 49 is welded or otherwise attached to the pivotally-mounted front wheel bracket 43 and includes a front axle 50, which projects through the extending ends of the wheel support 49 and the center of the front wheel 51 to rotatably mount the front wheel 51 on the front wheel bracket 43. Furthermore, the rear wheels 52 are fixed to the bottom panel 8 of the cart frame 2 by means of additional wheel supports 49 and rear axles 55, as illustrated in FIG. 2. In a most preferred embodiment of the invention the front wheel 51 and rear wheels 52 are each characterized by high impact plastic wheel rims 53, fitted with a rubber tire 54 on the perimeter thereof to reduce shock during towing. As further illustrated in FIG. 1, a pair of umbrella brackets 57 are attached to the side panels 4 and include aligned support openings 58, with a thumb screw 59 extending into the support openings 58, respectively.

In another preferred embodiment of the invention and referring to FIGS. 10–14, the utility cart of this invention is characterized by an ice chest receptacle 29, fitted with oppositely-disposed receptacle slots 29a for removably receiving an ice chest 65 specifically designed for the purpose or a commercial box, such as the popular "Igloo" ice chest. The "Igloo" ice chest 65 includes oppositely-disposed ice chest handles 66 which fit in the receptacle slots 29a when the ice chest 65 is placed in the ice chest receptacle 29, as illustrated in FIG. 10. Alternatively, the ice chest 65 is specially designed to fit in the ice chest receptacle 29 with about one-fourth of an inch clearance, for easy insertion and removal and is also fitted with ice chest handles 66 for this purpose. The interior of the ice chest 65 is most preferably provided with a partition panel to divide time interior into front and rear receptacles in the same manner as the front ice chest 19 and rear ice chest 20, divided by the partition panel 17, as illustrated in FIGS. 1 and 2. In yet another preferred embodiment of the invention a pivoting table top support is hinged to the side panels 4 of the utility cart 1 by means of vinyl hinges 15 and is provided with a support boss 63 which fits in a corresponding boss slot 31, provided in the underside of the table top 32, respectively, as further illustrated in FIGS. 13 and 14. Accordingly, the table tops 32 can be individually or together deployed in the functional horizontal configuration illustrated in FIG. 13 by initially lifting the table tops 32 and subsequently swinging the respective pivoting table top supports 62 outwardly beneath the table tops 32 until the respective support bosses 63 are aligned with and inserted in the corresponding boss slots 31 in the underside of the table tops 32. Positioning the table tops 32 back into substantially vertical folded configuration illustrated in FIG. 12 is achieved by reversing this procedure and again securing time table top retainer 61. It will be appreciated by those skilled in the art that the pivoting table top support 62 may also be used in connection with the utility cart embodiment illustrated in FIGS. 1 and 2. Likewise, the table support mechanism illustrated in FIGS. 3 and 4 may also be utilized in the utility cart embodiment illustrated in FIG. 10, as desired.

In use, the utility cart 1 in either the embodiment illustrated in FIGS. 1 and 2 or the embodiment illustrated in FIG. 10 may be located as desired place for a picnic, beach activity, "tailgate" party, family reunion or similar outdoor outing and deployed in a specific position by grasping the handle grip 42 in the towing handle 41 and extending the handle extensions 45 until the respective extension stops 48 contact the front wheel bracket 43. After the utility cart 1 is maneuvered into the desired location the towing handle 41 can be re-deployed in the recessed configuration illustrated in FIGS. 2 and 7 by reversing this procedure. In the case of the utility cart illustrated in FIG. 1, ice and beverages, as well as food, can then be added to the front ice chest 19 and the rear ice chest 20 by opening the ice chest lid 21 and various accessory equipment such as insect spray, table cloths, napkins, cups and the like may be removed from the storage compartment 10 by opening the storage compartment lid 11. One or more of the table tops 32 may then be raised to accommodate folding lawn chairs, stools or the like (not illustrated) by lifting the table tops 32 and deploying the support bar 37 as illustrated in FIGS. 3 and 4 and as heretofore described. An umbrella can then be deployed by removing the umbrella from the umbrella transport bracket 56, slipping the umbrella support 60 through the vertically aligned support openings 58 in the spaced umbrella brackets 57 and tightening the thumbscrews 59 to shade the extended table tops 32. While the umbrella is in this configuration and the table tops 32 are so extended, it will be appreciated that the ice chest lid 21 may be opened and closed as desired to remove beverages and/or food from the front ice chest 19 and rear ice chest 20. Folded lawn chairs, stools or like seating equipment, can then be removed from the space between the parallel rear chair supports 23 and front chair supports 30 by initially removing the respective top members 26 of some or all four of the rear chair supports 23, to provide easy access to the folding lawn chairs or the like. After removal of the chairs, the top members 26 may be replaced and the trash bag hook 28 then fitted with a trash bag to conveniently deposit paper plates, cups, napkins and the like during the party. After the folding lawn chairs or other seating equipment are removed, the storage compartment lid 11 may be raised and lowered as desired to provide access to the storage compartment 10. Should minor adjustments to the location of utility cart 1 be necessary, the rear handle 14 and front handle 14a may be grasped and the adjustments easily made without the necessity of extending the towing handle 41 and the towing of the utility cart 1. This maneuver can also be made when it is desired to load the utility cart 1 in the trunk of a car or bed of a pickup truck or other vehicle for transportation purposes over relatively long distances.

Under circumstances where the utility cart 1 illustrated in FIGS. 10–14 is utilized, after the utility cart 1 is located in a desired position as described above, the ice chest lid 21 (illustrated in FIG. 1) can be opened on the respective vinyl hinges 15 and a conventional or specially designed ice chest 65 inserted in the ice chest receptacle 29, with the corresponding ice chest handles 66 registering with the receptacle slots 29a located at each end of the ice chest receptacle 29. The ice chest lid 21 can then remain in the open configuration and beverages which are iced in the ice chest 65 may be removed by opening the conventional ice chest lid (not illustrated) provided on the ice chest 65, as necessary. The drain holes 40 provided in the utility cart illustrated in FIGS. 1 and 10, as well as the ice chest 65 facilitate easy drainage of the front ice chest 19, rear ice chest 20 in the utility cart illustrated in FIG. 1, as well as the ice chest receptacle 29 and ice chest 65 illustrated in FIG. 10 and the storage compartment 10 illustrated in FIGS. 1 and 10.

It will be appreciated by those skilled in the art that the utility cart of this invention is versatile and may be designed in several important variations, of which those described herein are only exemplary. For example, either utility cart 1 illustrated in FIGS. 1 and 10 may include a pair of front wheels 51, any desired number of table tops 32 and one or more sets of umbrella brackets 57 may be provided to support one or more umbrellas. Moreover, the number of compartments and ice chest configurations may vary with anticipated need.

Accordingly, while the preferred embodiments of the invention have been described above, it will be recognized and understood that various other modifications may be made in the invention and the appended claims are intended to cover all such modifications which may fall within the spirit and scope of the invention.

Having described my invention with the particularity set forth above, what is claimed is:

1. A utility cart comprising a frame having a front end and a rear end; a pair of wheels fixedly mounted on the rear end of said frame in rotatable relationship; a front wheel carried by a front wheel bracket pivotally mounted to the front end of said frame, said front wheel bracket having a pair of open channels extending therethrough with the front wheel mounted therebetween; a towing handle having a pair of laterally spaced parallel extensions members slidably received within said pair of open channels, each extension member having a forward extension portion and a rearward extension portion interconnected by a hinge, stop means provided on a rearward end of each rearward extension portion for terminating extension of said extension members from said front wheel bracket and grip means connected between opposite forward ends of said forward extension portions for extending said handle extension members with respect to the wheeled frame and said front wheel bracket for guiding and towing said utility cart; an ice chest receptacle provided on said front end of said frame for receiving a removable ice chest and an ice chest lid hingedly carried by said ice chest receptacle for selectively opening and closing access to the ice chest, said ice chest receptacle having forward and rearward walls with slots formed along upper edge portions thereof for receiving handles located on end walls of said removable ice chest; at least two table tops hingedly carried by said ice chest receptacle on each side of said ice chest receptacle and table top support means pivotally carried by said ice chest receptacle for selectively engaging said table tops and supporting said table tops in extended, substantially horizontal relationship; a storage compartment provided on said rear end of said frame and a storage compartment lid hingedly carried by said frame for selectively opening and closing said storage compartments; and a plurality of chair supports disposed in upward, free-standing relationship on said frame, with at least two of said chair supports characterized by a fixed segment carried by said frame and a removable segment removably carried by said fixed segment, for loading, unloading, supporting and carrying chairs on said utility cart.

* * * * *